(12) United States Patent
Iribe

(10) Patent No.: US 9,509,421 B2
(45) Date of Patent: Nov. 29, 2016

(54) DIFFERENTIAL SIGNAL TRANSMISSION CIRCUIT, DISK ARRAY CONTROLLER, AND DIFFERENTIAL SIGNAL TRANSMISSION CABLE

(75) Inventor: Tsunenori Iribe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 77 days.

(21) Appl. No.: 13/409,001

(22) Filed: Feb. 29, 2012

(65) Prior Publication Data
US 2012/0224614 A1 Sep. 6, 2012

(30) Foreign Application Priority Data

Mar. 2, 2011 (JP) .................. 2011-045234

(51) Int. Cl.
*H04B 17/00* (2015.01)
*H04B 17/17* (2015.01)

(52) U.S. Cl.
CPC ..................... *H04B 17/17* (2015.01)

(58) Field of Classification Search
CPC .................. H04B 17/0022–17/0037
USPC ............. 375/219, 297, 257; 324/533, 527; 327/108
See application file for complete search history.

(56) References Cited

U.S. PATENT DOCUMENTS

| | | | | |
|---|---|---|---|---|
| 5,142,526 A | * | 8/1992 | Moriue | H04J 3/14 370/245 |
| 5,295,132 A | * | 3/1994 | Hashimoto | H04L 25/08 327/63 |
| 5,398,261 A | * | 3/1995 | Marbot | H03H 11/28 327/524 |
| 5,757,415 A | * | 5/1998 | Asamizuya et al. | 725/114 |
| 6,124,727 A | * | 9/2000 | Bridgewater, Jr. | H04L 25/0272 326/30 |
| 6,418,110 B1 | * | 7/2002 | Baird | 369/124.1 |
| 7,167,018 B1 | * | 1/2007 | Wu et al. | 326/26 |
| 7,190,188 B2 | * | 3/2007 | Otsuka | H04L 25/08 326/30 |
| 7,581,137 B2 | * | 8/2009 | Okada et al. | 714/24 |
| 7,617,360 B2 | * | 11/2009 | Arai et al. | 711/114 |
| 7,719,324 B1 | * | 5/2010 | Snowdon et al. | 327/108 |
| 7,804,793 B1 | * | 9/2010 | Felton | 370/284 |

(Continued)

FOREIGN PATENT DOCUMENTS

JP 2003-517773 A 5/2003

OTHER PUBLICATIONS

Hein Marais, "RS-485/RS-422 Circuit Implementation Guide", Analog Devices AN-960 Application Note 2008.—Retrieved from the Internet: URL http://www.analog.com/static/imported-files/application_notes/AN-960.pdf.*

*Primary Examiner* — Daniel Washburn
*Assistant Examiner* — Berhanu Tadese
(74) *Attorney, Agent, or Firm* — McGinn IP Law Group, PLLC.

(57) ABSTRACT

The invention provides a differential signal transmission circuit, a disk array controller, and a differential signal transmission cable, which are capable of allowing a worker to easily confirm a failure in a differential signal transmission path. The differential signal transmission circuit includes an inductance provided between positive and negative transmission paths, a DC voltage part that applies a DC voltage to the transmission paths, a monitoring part that monitors a magnitude of the DC voltage applied to the transmission paths, and a controller that detects a failure in each of the transmission paths on the basis of the magnitude of the DC voltage monitored by the monitoring part, and, when the failure is detected, outputs a notification of the occurrence of the failure.

20 Claims, 3 Drawing Sheets

(56) References Cited

U.S. PATENT DOCUMENTS

| | | | |
|---|---|---|---|
| 7,834,638 B2 * | 11/2010 | Kondo | H04L 25/0272 324/527 |
| 7,928,737 B2 * | 4/2011 | Hernandez | 324/527 |
| 8,188,764 B2 * | 5/2012 | Weiss et al. | 326/86 |
| 8,239,692 B1 * | 8/2012 | Robillard et al. | 713/300 |
| 2003/0041278 A1 * | 2/2003 | Lin | 714/1 |
| 2003/0056031 A1 * | 3/2003 | Dauerer | H04L 25/085 710/1 |
| 2004/0123197 A1 * | 6/2004 | Sunter | G01R 31/2834 714/724 |
| 2005/0094737 A1 * | 5/2005 | Vorenkamp | H04L 25/08 375/257 |
| 2005/0281343 A1 * | 12/2005 | Hsu | H04L 25/03343 375/257 |
| 2006/0181303 A1 * | 8/2006 | Dreps et al. | 326/29 |
| 2007/0116134 A1 * | 5/2007 | Schoenborn | G06F 13/4077 375/257 |
| 2007/0208520 A1 * | 9/2007 | Zhang et al. | 702/58 |
| 2008/0098164 A1 * | 4/2008 | Lee et al. | 711/103 |
| 2008/0158216 A1 * | 7/2008 | Kuroda | G06F 1/3218 345/211 |
| 2008/0240288 A1 * | 10/2008 | Kondo | 375/297 |
| 2008/0304578 A1 * | 12/2008 | Matsubara | H04B 3/30 375/257 |
| 2009/0213914 A1 * | 8/2009 | Dong | H01L 23/48 375/219 |
| 2010/0079172 A1 * | 4/2010 | Katoh | H03K 19/01852 327/72 |
| 2010/0321069 A1 * | 12/2010 | Komatsu | H04L 25/0272 327/108 |
| 2011/0075761 A1 * | 3/2011 | Kuwata | H04L 25/0272 375/296 |
| 2011/0227641 A1 * | 9/2011 | Weiss | H04L 25/0272 327/595 |
| 2012/0044985 A1 * | 2/2012 | Tao | H04N 21/23436 375/240.01 |
| 2012/0155559 A1 * | 6/2012 | Yamasaki | H04L 25/0284 375/257 |

* cited by examiner

DIFFERENTIAL SIGNAL TRANSMISSION CIRCUIT, DISK ARRAY CONTROLLER, AND DIFFERENTIAL SIGNAL TRANSMISSION CABLE

CROSS-REFERENCES

This application is based upon and claims the benefit of priority from Japanese patent application No. 2011-045234, filed on Mar. 2, 2011, the disclosure of which is incorporated herein in its entirety by reference.

BACKGROUND

The present invention relates to a differential signal transmission circuit, a disk array controller, and a differential signal transmission cable.

Circuits and cables with differential signal transmission paths are known. There is known a technology for transmitting differential signals using such circuits and cables, where a transmission state of a differential signal is detected and high-frequency vibration of a transmitter is suppressed in order to avoid damage or breaking of the transmitter. For example, as information on a drive status of the transmitter, a receiver uses a DC component detected by a detector (see Japanese Translation of PCT Application No. 2003-517773, for example).

A circuit and a cable having a differential signal transmission path is incorporated and used in housings of a variety of apparatuses. Therefore, it is not easy for a repairer to open a housing equipped with the circuit and cable, in case of a data transfer failure. There was no easy method to confirm whether the data transfer failure was due to, for example, breaking of the differential signal transmission path.

Moreover, there was no method for a worker to non-visually inspect whether or nota unit was correctly connected using the cable having the differential signal transmission path. Thus, there is a limit on the accuracy of inspection. There were cases where an error occurs when activating an apparatus equipped with the unit and the connection of the cable was found to be incorrect.

In addition, according to the technology described in Japanese Translation of PCT Application No. 2003-517773, the information on the drive status of the transmitter can be obtained. However, it is not enough to apply power to the transmitter in order to obtain this information, and this technology therefore needs to carry out a process of applying power to the receiver as well and thereafter acquiring the information on the drive status of the transmitter. This process, however, increases the number of steps related to the inspection.

SUMMARY

The invention was contrived in view of the above circumstances. An exemplary object of the invention provides a differential signal transmission circuit, a disk array controller, and a differential signal transmission cable, which are capable of allowing a worker to easily confirm a failure in a differential signal transmission path.

The present invention is a differential signal transmission circuit in which first and second circuits, capable of transmitting/receiving signals, are connected to each other by positive and negative transmission paths, the differential signal transmission circuit having: an inductance provided between the positive and negative transmission paths; a DC voltage part that applies a DC voltage to the transmission paths; a monitoring part that monitors a magnitude of the DC voltage applied to the transmission paths; and a controller that detects a failure in each of the transmission paths on the basis of the magnitude of the DC voltage monitored by the monitoring part, and, when the failure is detected, outputs a notification of the occurrence of the failure.

The invention can provide a differential signal transmission circuit, a disk array controller, and a differential signal transmission cable, which are capable of allowing a worker to easily confirm a failure in a differential signal transmission path.

EXEMPLARY EMBODIMENT

Exemplary embodiments of the invention are described hereinafter with reference to the drawings.

First Exemplary Embodiment

Figure 1:
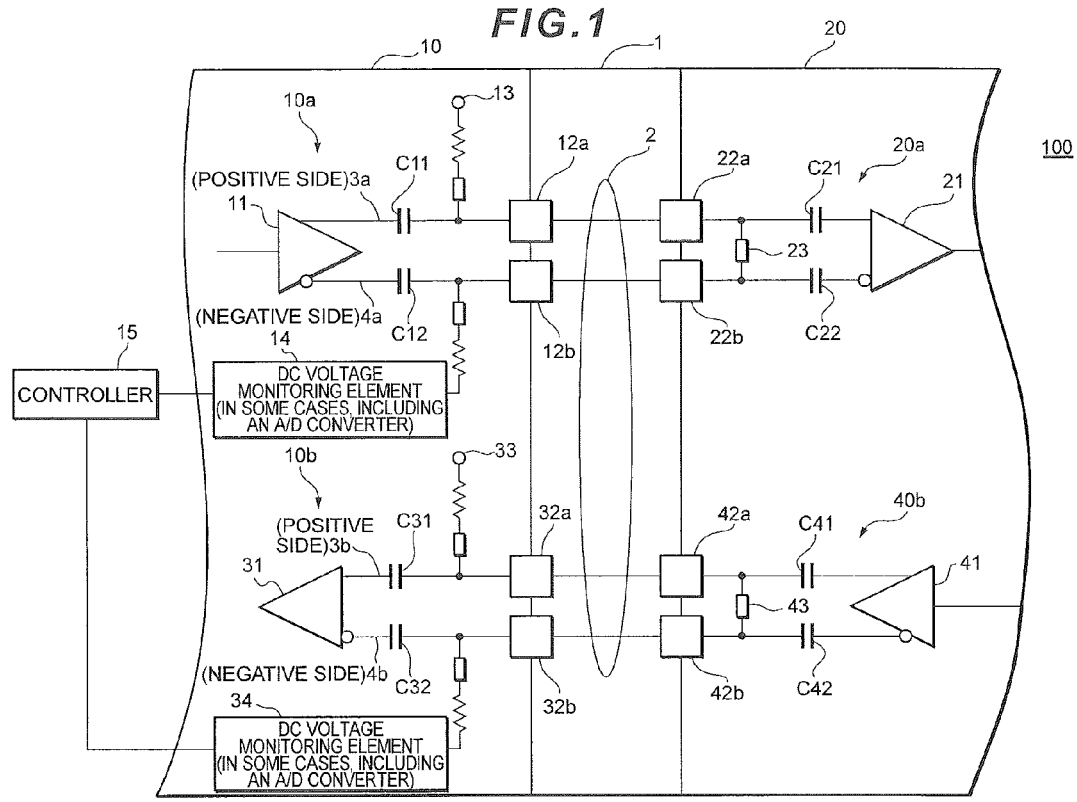
FIG. 1 is a diagram showing a configuration of a differential signal transmission circuit according to a first embodiment of the invention.

FIG. 1 is a diagram showing a configuration of a differential signal transmission circuit 100. As shown in this diagram, the differential signal transmission circuit 100 has a board 10 and a board 20, which are connected by a differential signal transmission path 2 provided on a backboard 1.

The differential signal transmission path 2 is configured by positive and negative signal lines 3a and 4a, which connect a differential signal transmitting IC 10a provided in the board 10 and a differential signal receiving IC 20a provided in the board 20, and positive and negative signal lines 3b and 4b, which connect a differential signal receiving IC 10b provided in the board 10 and a differential signal transmitting IC 20b provided in the board 20.

Note that the differential signal transmission path 2 may be configured in a manner as to be stored in a predetermined cable without the backboard 1.

In the board 10, the differential signal transmitting IC 10a has a transmitting element 11, connectors 12a, 12b, a DC voltage application part 13, a DC voltage monitoring element 14, and capacitors C11, C12.

The positive signal line 3a extends from a positive terminal of the transmitting element 11 and is connected to the connector 12a via the capacitor C11. The negative signal line 4a extends from a negative terminal of the transmitting element 11 and is connected to the connector 12b via the capacitor C12.

The DC voltage application part 13 is provided so as to apply a predetermined DC voltage between the capacitor C11 and the connector 12a on the signal line 3a. The DC voltage monitoring element 14 is provided so as to be able to detect the magnitude of DC voltage on the signal line 4a.

The differential signal receiving IC 10b has a receiving element 31, connectors 32a, 32b, a DC voltage application part 33, a DC voltage monitoring element 34, and capacitors C31, C32.

The signal line 3b extends from the connector 32a and is connected to a positive terminal of the receiving element 31 via the capacitor C31. The signal line 4b extends from the connector 32b and is connected to a negative terminal of the receiving element 31 via the capacitor C32.

The DC voltage application part 33 is provided so as to apply a predetermined DC voltage between the capacitor C31 and the connector 32a on the signal line 3b. The DC voltage monitoring element 34 is provided so as to be able to detect the magnitude of DC voltage on the signal line 4b.

Furthermore, a controller 15 is connected to the DC voltage monitoring elements 14 and 34 described above.

In the board 20, on the other hand, the differential signal receiving IC 20a has a receiving element 21, connectors 22a, 22b, capacitors C21, C22, and an inductance 23.

The signal line 3a extends from the connector 22a and is connected to a positive terminal of the receiving element 21 via the capacitor C21. The signal line 4a extends from the connector 22b and is connected to a negative terminal of the receiving element 21 via the capacitor C22.

The inductance 23 is provided between the connector 22a, 22b and the capacitor C21, C22 so as to connect the signal lines 3a, 4a to each other.

The differential signal transmitting IC 40b has a transmitting element 41, connectors 42a, 42b, capacitors C41, C42, and an inductance 43.

The positive signal line 3b extends from a positive terminal of the transmitting element 41 and is connected to the connector 42a via the capacitor C41. The negative signal line 4b extends from a negative terminal of the transmitting terminal 41 and is connected to the connector 42b via the capacitor C42.

The inductance 43 is provided between the connector 42a, 42b and the capacitor C41, C42 so as to connect the signal lines 3b, 4b to each other.

The DC voltage application part 13, the DC voltage monitoring element 14, the controller 15, and the inductance 23 are described now in detail. Note that the DC voltage application part 33, the DC voltage monitoring element 34 and the inductance 43 are substantially the same as the DC voltage application part 13, the DC voltage monitoring element 14 and the inductance 23. Thus, the detailed descriptions of the former components are omitted.

The DC voltage application part 13 applies a DC voltage to the signal line 3a by using, for example, a power-supply voltage of another IC provided on the board 10. The magnitude of this DC voltage is 3.3 V in this embodiment.

The DC voltage monitoring element 14 monitors a DC voltage applied to the signal line 4a. The DC voltage monitoring element 14 detects the magnitude of the DC voltage applied to the signal line 4a, at all times during an operation of the DC voltage monitoring element 14. The DC voltage monitoring element 14 uses, for example, an ND converter to convert the detected magnitude of the DC voltage into a digital signal, and outputs the digital signal to the controller 15.

The controller 15, which is, for example, a CPU (Central Processing Unit) or a FPGA (Field-Programmable Gate Array), uses the digital signal output from the DC voltage monitoring element 14, to determine whether a failure has occurred in the signal lines 3a, 4a, i.e., the differential signal transmission path 2.

More specifically, the controller 15 determines whether or not the magnitude of the DC voltage is 3.3 V or not, based on the digital signal transmitted from the DC voltage monitoring element 14. When the magnitude of 3.3 V cannot be detected, that is, when a magnitude of 0 V is detected, the controller 15 determines that a physical failure exists in the differential signal transmission path 2. In this case, the controller 15 performs control for stopping the use of the differential signal transmission path 2 and then uses, for example, a display unit (not shown) to notify a repairer (worker) and the like of the occurrence of a failure of the differential signal transmission path 2.

The inductance 23 is provided so as to connect the signal lines 3a, 4a. Therefore, the inductance 23 can prevent the occurrence of data short-circuit, which occurs when configuring the differential signal transmission path by simply connecting the transmitting element 11 and the receiving element 21 to each other using positive and negative signal lines. As a result, data can be transferred properly.

More specifically, when data transfer speed of the differential signal transmission path 2 is several Gbit/s, the impedance of the inductance 23 increases. As a result, to the data, the positive and negative signal lines 3a, 4a appear to be disconnected. For the DC voltage, on the other hand, the impedance of the inductance 23 is extremely small, and the voltage applied to the positive signal line 3a is transferred to the negative signal line 4b.

Because the differential signal transmission path 2 is configured in a manner as to distinguish between Hi and Low of the digital signal on the basis of a difference in voltage between the positive and negative signal lines 3a, 4a, proper data transfer can be realized by evening out the voltages of the positive and negative signal lines 3a, 4a. Therefore, with the inductance 23 provided between the positive and negative signal lines 3a, 4a, the differential signal transmission circuit 100 can prevent the occurrence of abnormal data transfer and realize proper data transfer, even when the DC voltage is applied by the DC voltage application part 13.

According to the differential signal transmission circuit 100 configured as described above, the controller 15 can detect the occurrence of a physical failure in the differential signal transmission path 2, which is, more specifically, a failure caused due to breaking of the signal lines 3a, 4a or the signal lines 3b, 4b, on the basis of the magnitude of the DC voltage monitored by the DC voltage monitoring element 14. Moreover, when the failure is detected, the controller 15 can output to the display unit (not shown) the fact that the failure exists, and notify the repairer of the occurrence of the failure.

In addition, based on whether the DC voltage monitoring element 14 or 34 detects the magnitude of 0V or not, the controller 15 can determine whether a failure exists in the signal lines 3a, 4a or the signal lines 3b, 4b. Information that specifies the signal lines having a failure may be included in the abovementioned notification of the occurrence of a failure.

Moreover, in the differential signal transmission circuit 100, the DC voltage application parts 13, 33 are provided only in the board 10. Therefore, even when no power is supplied to the board 20, or even when power is supplied only to the board 10, the controller 15 can detect the failure occurring in the signal lines 3a, 4a or the signal lines 3b, 4b.

Next is described the cases in which the differential signal transmission circuit 100 with the abovementioned configurations is applied to a disk array controller of a storage system and to a differential signal transmission cable.

Second Exemplary Embodiment

Figure 2:
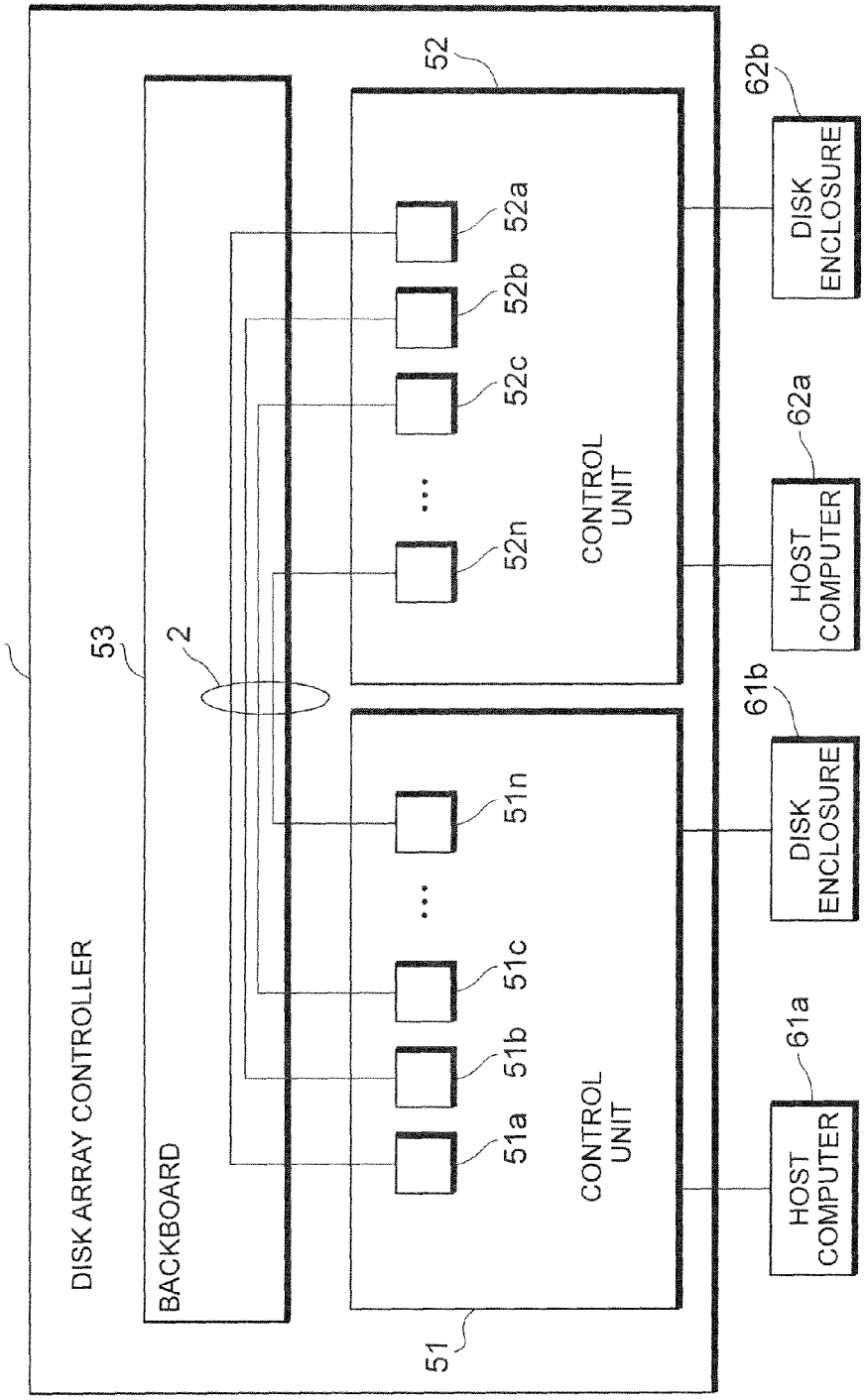
FIG. 2 is a diagram showing a disk array controller according to a second embodiment of the invention.

First, the case in which the above-described differential signal transmission circuit 100 is applied to a disk array controller 50 of a storage system 101 is described with reference to FIG. 2.

The disk array controller ("DAC" hereinafter) 50 is an apparatus for transmitting and receiving data to and from host computers 61a, 62a and disk enclosures ("DE" hereinafter) 61b, 62b.

The DAC 50 has a control unit 51, a control unit 52, and a backboard 53, in a housing. The control unit 51 is configured in a manner as to communicate data with the host computer 61a and the DE 61b. The control unit 52 is configured in a manner as to communicate data with the host computer 62a and the DE 62b.

The control units 51, 52 are capable of communicating with each other via the differential signal transmission path 2 passing above the backboard 53.

The differential signal transmission path 2 is configured by connecting transmitting/receiving elements 51a, 51b, 51c, . . . , 51n of the control unit 51 and transmitting/receiving elements 52a, 52b, 52c, . . . , 52n of the control unit 52 to each other. The transmitting/receiving elements 51a, 51b, 51c, . . . , 51n have the same configuration as the board 10 that is described with reference to FIG. 1. The transmitting/receiving elements 52a, 52b, 52c, . . . , 52n have the same configuration as the board 20 that is described with reference to FIG. 1. Since the descriptions of these elements are same as those provided above, the detailed illustrations and descriptions thereof are omitted. Note that the controller 15 mentioned above is configured in a manner as to receive input of digital signals from all of the DC voltage monitoring elements 14, 34 included in the transmitting/receiving elements 51a, 51b, 51c, . . . , 51n.

The DAC 50 can redundantly write data into the DE 61b, 62 by connecting the two control units 51, 52 by means of the differential signal transmission path 2. The other configurations inside the DAC 50 are same as those of the conventional technologies, thus the detailed descriptions thereof are omitted.

In the DAC 50 with the above-described configurations, when, for example, a communication failure occurs for some reason during transmission of data from the control unit 51 to the control unit 52, the controller 15 can determine whether the failure is due to breaking or the like of the signal lines 3a, 4a, 3b, 4b, i.e., the differential signal transmission path 2, in accordance with the magnitude of a DC voltage monitored by each of the DC voltage monitoring elements 14, 34.

More specifically, when a value of a current voltage transmitted from each of the DC voltage monitoring elements 14, 34 conforms with a value of a DC voltage applied by each of the DC voltage application parts 13, 33, the controller 15 can determine that the failure is not due to breaking or the like of the differential signal transmission path 2 but due to other reasons. When the value of the current voltage transmitted from each of the DC voltage monitoring elements 14, 34 include 0 V, the controller 15 can determine that the failure is due to the breaking of breaking of the differential signal transmission path 2.

The controller 15 can also specify any of the signal lines of the differential signal transmission path 2 where breaking or other failure exists, by specifying a DC voltage monitoring element that detects the magnitude of 0 V, the differential signal transmission path 2 being configured by the signal lines provided between the plurality of transmitting/receiving elements. The controller 15 may display this information along with information on the failure, on the display unit (not shown).

According to the DAC 50 configured as described above, when the DAC 50 cannot perform proper data transfer using the differential signal transmission path 2 during the operation of the DAC 50, the repairer can understand from the display unit (not shown) whether a failure exists in the differential signal transmission path 2 or not.

Therefore, providing the control units 51, 52 and the backboard 53 in the housing of the DAC 50 can avoid a situation where the repairer cannot access the control units 51, 52 and the backboard 53 by opening the housing to understand whether a failure exists in the differential signal transmission path 2 or in other parts.

Moreover, because the transmitting/receiving elements 51a to 51n of the storage system 101 have the same configuration as the abovementioned board 10, the repairer can check whether or not a failure exists in the differential signal transmission path 2, by supply power only to the control unit 51.

Third Exemplary Embodiment

Figure 3:
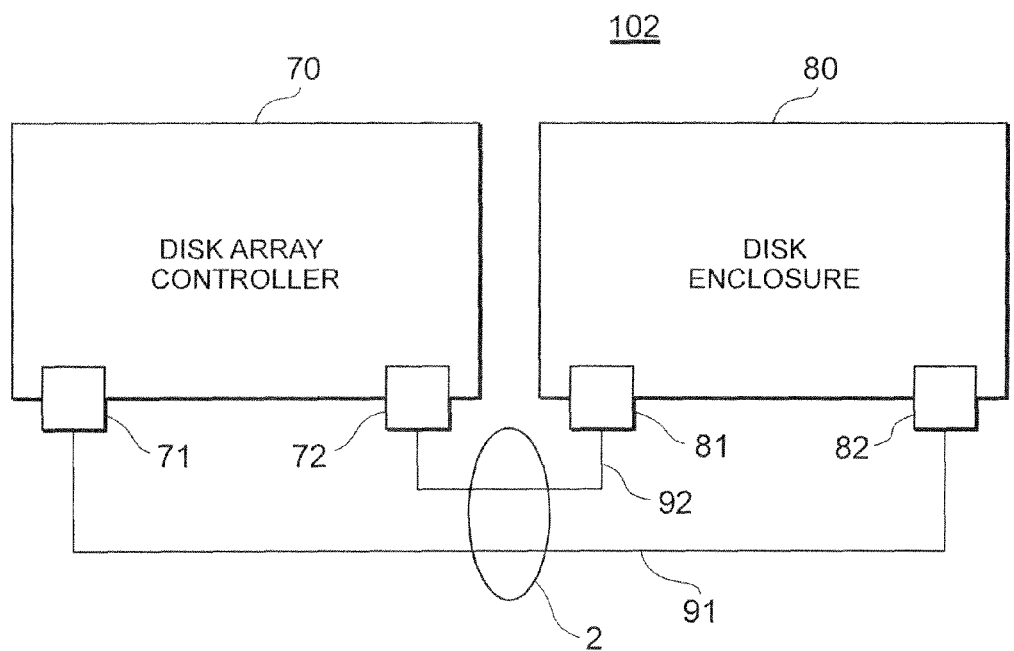
FIG. 3 is a diagram showing an example of connection of a differential signal transmission cable according to a third embodiment of the invention.

Next is described the case in which the above-described differential signal transmission circuit is applied to a differential signal transmission cable, with reference to FIG. 3.

As shown in FIG. 3, a storage system 102 uses differential signal transmission cables 91, 92 to connect a DAC 70 and a DE 80 to each other. The DE 80 accepts data from the DAC 70 via the differential signal transmission cables 91, 92, and writes/reads the data into/from a hard disk drive inside the DE 80. The DAC 70 can redundantly write data into the DE 80 by using the differential signal transmission cables 91, 92.

The differential signal transmission circuit 100 described with reference to FIG. 1 is applied to each of the differential signal cables 91, 92. More specifically, a configuration same as that of the board 10 is provided within each of connectors 71, 72 connected to the DAC 70, and a configuration same as that of the board 20 is provided within each of connectors 81, 82 connected to the DE 80. The differential signal transmission path 2 is stored in each of the differential signal transmission cables 91, 92.

In the storage system 102 configured as described above, the controller 15 Confirms the magnitude of a DC voltage value monitored by each of the DC voltage monitoring elements 14, 34. In this case, because the configuration same as that of the board 10 is provided within the connectors 71, 72 connected to the DAC 70, the repairer can confirm the connections of the differential signal transmission cables 91, 92 as long as power is applied only to the DAC 70.

For example, when power is supplied to the DAC 70, a control unit of the storage system 102 confirms the connections of the differential signal transmission cables 91, 92. When the connections of the differential signal transmission cables 91, 92 cannot be confirmed, the control unit notifies the repairer of the occurrence of a failure by emitting an LED or performing other process prior to the activation of the DAC 70, and stops an activation operation of the DAC 70. When, on the other hand, the connections of the differential signal transmission cables 91, 92 can be confirmed, the control unit starts supplying power to the DE 80.

As a result, the repairer can confirm whether or not the differential signal transmission cables 91, 92 are connected properly prior to the activation of the storage system 102. This can prevent the occurrence of a failure that occurs when the storage system 102 is activated while the differential signal transmission cables 91, 92 are not connected, i.e., a failure in which the DAC 70 and the DE 80 cannot be activated.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Part or all of the embodiments are described in the following additional notes but are not limited thereto.

Additional Note 1

A differential signal transmission circuit in which first and second circuits, capable of transmitting/receiving signals, are connected to each other by positive and negative transmission paths, the differential signal transmission circuit having:

an inductance provided between the positive and negative transmission paths;

a DC voltage part that applies a DC voltage to the transmission paths;

a monitoring part that monitors a magnitude of the DC voltage applied to the transmission paths; and a controller that detects a failure in each of the transmission paths on the basis of the magnitude of the DC voltage monitored by the monitoring part, and, when the failure is detected, outputs a notification of the occurrence of the failure.

Additional Note 2

The differential signal transmission circuit according to additional note 1, wherein the DC voltage part and the monitoring part are provided in either the first circuit or the second circuit.

Additional Note 3

A disk array controller that has a first control unit and a second control unit in the same housing, the disk array controller having:

a differential signal transmission circuit in which the first control unit and the second control unit are connected to each other by positive and negative transmission paths; and a controller, wherein the differential signal transmission circuit has:

an inductance provided between the positive and negative transmission paths;

a DC voltage part that applies a DC voltage to the transmission paths; and a monitoring part that monitors a magnitude of the DC voltage applied to the transmission paths, and wherein the controller detects a failure in each of the transmission paths of the differential signal transmission circuit on the basis of the magnitude of the DC voltage monitored by the monitoring part, and, when the failure is detected, outputs a notification of the occurrence of the failure.

Additional Note 4

A differential signal transmission cable which has stored therein positive and negative transmission paths used for connecting first and second circuits capable of transmitting/receiving signals, the differential signal transmission cable having:

an inductance provided between the positive and negative transmission paths;

a DC voltage part that applies a DC voltage to the transmission paths;

a monitoring part that monitors a magnitude of the DC voltage applied to the transmission paths; and a controller that detects a failure in each of the transmission paths on the basis of the magnitude of the DC voltage monitored by the monitoring part, and, when the failure is detected, outputs a notification of the occurrence of the failure.

The invention can be applied widely to circuits, cables and methods that use differential signal transmission paths.

I claim:

1. A differential signal transmission circuit in which first and second circuits, capable of at least one of transmitting signals and receiving signals, are connected to each other by a positive transmission path and a negative transmission path, the differential signal transmission circuit comprising:

an inductor provided between the positive transmission path and the negative transmission path;

a DC voltage part that applies a DC voltage to the transmission paths;

a monitoring part that monitors a magnitude of the DC voltage applied to the transmission paths; and a controller that detects a failure in one or more of the transmission paths on a basis of whether or not the DC voltage monitored by the monitoring part is a predetermined value, and, when the failure is detected, outputs a notification of an occurrence of the failure, wherein the DC voltage part and the monitoring part are provided in the first circuit.

2. A disk array controller comprising a first control unit and a second control unit in a same housing, the disk array controller comprising:

a differential signal transmission circuit in which the first control unit and the second control unit are connected to each other by a positive transmission path and a negative transmission path; and a controller, wherein the differential signal transmission circuit comprises:

an inductor provided between the positive transmission path and the negative transmission path;

a DC voltage part that applies a DC voltage to the transmission paths; and a monitoring part that monitors a magnitude of the DC voltage applied to the transmission paths, wherein the controller detects a failure in one or more of the transmission paths of the differential signal transmission circuit on a basis of whether or not the DC voltage monitored by the monitoring part is a predetermined value, and, when the failure is detected, outputs a notification of an occurrence of the failure, and wherein the DC voltage part and the monitoring part are provided in the first control unit.

3. A differential signal transmission cable which has stored therein a positive transmission path and a negative transmission path used for connecting first and second circuits capable of at least one of transmitting signal and receiving signals, the differential signal transmission cable comprising:

an inductor provided between the positive transmission path and the negative transmission path;

a DC voltage part that applies a DC voltage to the transmission paths;

a monitoring part that monitors a magnitude of the DC voltage applied to the transmission paths; and a controller that detects a failure in one or more of the transmission paths on a basis of whether or not the DC voltage monitored by the monitoring part is a predetermined value, and, when the failure is detected, outputs a notification of an occurrence of the failure, wherein the DC voltage part and the monitoring part are provided in the first circuit.

4. The differential signal transmission circuit according to claim 1, wherein said inductor connects said positive transmission path and said negative transmission path.

5. The differential signal transmission circuit according to claim 1, wherein said monitoring part outputs a digital signal corresponding to a detected magnitude, to said controller.

6. The differential signal transmission circuit according to claim 1, wherein said monitoring part comprises an Analog/Digital (AID) converter for converting a detected magnitude of the DC voltage to a digital signal.

7. The differential signal transmission circuit according to claim 1, wherein said controller detects said failure by comparing a magnitude of the DC voltage with a predetermined voltage value.

8. The differential signal transmission circuit according to claim 1, wherein when said failure is detected, said controller stops a use of said positive transmission path and said negative transmission path.

9. The differential signal transmission circuit according to claim 1, wherein said failure comprises a physical failure in a transmission path.

10. The differential signal transmission circuit according to claim 1, wherein said failure comprises a breaking of one or more of said positive transmission path and said negative transmission path.

11. The differential signal transmission circuit according to claim 1, wherein said first circuit comprises a transmitting side circuit.

12. The differential signal transmission circuit according to claim 1, wherein said second circuit comprises a receiving side circuit.

13. The differential signal transmission circuit according to claim 1, wherein said detecting a failure of said controller is uninterrupted when power is other than supplied to said second circuit.

14. The differential signal transmission circuit according to claim 1, wherein said controller detects said failure in an absence of a power source for said second circuit.

15. The differential transmission circuit according to claim 1,
wherein said positive transmission path comprises a plurality of positive side lines, and
wherein said negative transmission path comprises a plurality of negative side lines.

16. The differential transmission circuit according to claim 15, wherein said controller identifies one or more of said plurality of positive side lines which are subject to said failure.

17. The differential transmission circuit according to claim 15, wherein said controller identifies one or more of said plurality of negative side lines which are subject to said failure.

18. The differential transmission circuit according to claim 1, wherein said controller outputs information which indicates a specific signal line that is subject to said failure.

19. The differential transmission circuit according to claim 18, wherein said notification of the occurrence of said failure comprises said information which indicates said specific signal line that is subject to said failure.

20. The differential transmission circuit according to claim 1, further including a plurality of lines,
wherein the plurality of lines respectively include the inductor, the DC voltage part and the monitoring part,
wherein the controller outputs information which specifies a line having a failure, and
wherein the information is included in the notification of the occurrence of said failure when the controller detects said failure in said plurality of lines.

* * * * *